United States Patent
Zeng et al.

(10) Patent No.: US 7,830,686 B2
(45) Date of Patent: Nov. 9, 2010

(54) ISOLATED HIGH POWER BI-DIRECTIONAL DC-DC CONVERTER

(75) Inventors: Qingrong Zeng, Mississauga (CA); Tejinder Singh, Burlington (CA); Nicolae A. Morcov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 625 days.

(21) Appl. No.: 11/758,099

(22) Filed: Jun. 5, 2007

(65) Prior Publication Data
US 2008/0304292 A1 Dec. 11, 2008

(51) Int. Cl.
*H02M 7/00* (2006.01)
(52) U.S. Cl. .......................................... 363/69; 363/71
(58) Field of Classification Search ............... 363/65–72
See application file for complete search history.

(56) References Cited

U.S. PATENT DOCUMENTS

| | | | |
|---|---|---|---|
| 3,986,097 A | 10/1976 | Woods | |
| 6,121,768 A | 9/2000 | Taurand | |
| 6,545,815 B2 | 4/2003 | Kroupenkine et al. | |
| 6,574,125 B2 * | 6/2003 | Matsukawa et al. | 363/71 |
| 6,577,106 B2 | 6/2003 | Lazarovich | |
| 6,853,562 B2 * | 2/2005 | Zhang | 363/21.06 |
| 2002/0109406 A1 | 8/2002 | Aberle et al. | |
| 2003/0021132 A1 * | 1/2003 | Frus et al. | 363/65 |
| 2003/0128556 A1 * | 7/2003 | Zhang | 363/21.06 |

* cited by examiner

*Primary Examiner*—Jessica Han
(74) *Attorney, Agent, or Firm*—Oral Caglar, Esq.

(57) ABSTRACT

A bi-directional dc-dc converter is provided that may provide voltage conversion for two separate electrical power systems. The two electrical power systems may have different functions, electrical requirements and power transfer directions. The bi-directional dc-dc converter may include back-to-back bi-directional dc-dc converter circuits isolated from each other by a transformer. Multiple such dc-dc converters may be connected in parallel to increase power capability. Phase shift pulse width modulation (PWM) may be used to switch the parallel dc-dc converters so as to decrease both voltage ripple and current ripple. The number of dc-dc converters may be modified to meet the different needs of various electric power systems. A single bi-directional dc-dc converter of the invention may be employed to provide electric power conversion for multiple electric power systems, even where those systems have different power requirements and different power transfer directions.

13 Claims, 9 Drawing Sheets

ISOLATED HIGH POWER BI-DIRECTIONAL DC-DC CONVERTER

BACKGROUND OF THE INVENTION

The present invention relates to electric power conversion systems, and more particularly, to switched mode energy storage DC-DC electric power conversion systems capable of providing power to a plurality of electric power systems.

Electric power systems, such as those found on vehicles and aircraft, often are used to produce electric power for different kinds of on-board electronic equipment having different functions and electrical requirements. For example, battery chargers and motors, such as those used for starters in auxiliary power units, may require different voltages, currents and polarities.

Electric power conversion systems are used to supply subsystems with the required electrical energy by converting electrical energy from a main generator into the specific form needed. Where electrical subsystems have very different functions and power transfer directions, such as starters and motors, more than one electric power conversion systems may be needed. Multiple power conversion systems may also be needed to provide electrical isolation between different subsystems.

There are a number of drawbacks with using multiple power conversion systems. The multiple units may add to the overall system cost. System performance can be degraded by the additional weight and volume. Also, the additional electrical components can reduce reliability and lower efficiency.

Where dual voltages are required to be transferred in two directions between two voltage subsystems, bi-directional dc-dc converters are one type of converter that can operate in two directions. Bi-directional dc-dc converters are energy storage converters which are based on the implementation of energy transfer cycles. These cycles may include a period of accumulation of magnetic energy in an inductive component, via a primary circuit, followed by a period of restitution of this energy into a load to be supplied, via a secondary circuit. Bi-directional converters can transfer energy from the primary circuit to the secondary circuit as well as from the secondary circuit to the primary circuit. Such bi-directional converters are particularly well suited to the supplying of complex loads (capacitive and/or inductive loads), accumulators or, further, reversible devices such as electric motors, which are likely to send energy back to the power source.

A "buck-boost" converter is one type of bi-directional converter, the inductive component of which is a single-winding inductance. U.S. Pat. No. 4,746,151 shows an example of a "buck-boost" converter. A "fly-back" converter is a converter, where the inductive component is a transformer including at least two windings. U.S. Pat. No. 3,986,097 shows one example of an energy storage bi-directional "fly-back" converter.

Prior bi-directional dc-dc converters can suffer from one or more of the following problems: high switching losses, necessity of an isolated feedback, difficult no-load control, and low efficiency due to losses in the output rectifier, particularly with low output voltages. Because of these problems, bi-directional converters are best suited for low power applications.

As can be seen, there is a need for a converter that can meet the needs of a plurality of power conversion systems having different functions and power transfer directions. There is also a need for a converter which minimizes the duplication of components to achieve improvements in volume, weight, reliability and efficiency. There is a further need for a bi-directional dc-dc converter that can handle high power requirements, and provide isolation with minimum switching losses.

SUMMARY OF THE INVENTION

In one aspect of the present invention, a system for providing electrical power comprises: a succession of converters each having a switch, inputs and outputs, the inputs of the succession of converters being connected to each other in parallel, and the outputs of the succession of converters being connected to each other in parallel; a phase-shift pulse width modulation controller connected to each of the switches, the phase-shift pulse width modulation controller generating a control signal including a series of pulses that cause the switches to turn on and off; and the series of pulses being timed such that the pulses controlling switches in different ones of the succession of converters are out of phase with each other.

In another aspect of the present invention, a converter system comprises: a first converter circuit having input and output terminals, the first converter also having a first transformer having first and second windings; the first converter circuit having a first switch coupled to the input terminals and to the first winding; the first converter circuit having a capacitor coupled to the second winding and to the output terminals; a second converter circuit having input and output terminals, the second converter circuit also having a second transformer having first and second windings; the second converter circuit having a second switch coupled to the input terminals and to the first winding, wherein the second converter circuit input terminals are connected to the first converter circuit input terminals in a parallel configuration and the second converter circuit output terminals are connected to the first converter circuit output terminals in a parallel configuration; and wherein an output voltage generated by the converter system is a combination of voltages generated by the first and second converter circuits.

In a further aspect of the present invention, an electric power conversion system connected between two electric power systems comprises: first and second input/output terminals connected to a first electric power system; first and second output/input terminals connected to a second electric power system, the first and second electric power systems having different electric power requirements and different power transfer directions; a plurality of bi-directional dc-dc converters, each having first and second inputs/outputs connected in parallel to the first and second input/output terminals and each of the plurality of bi-directional dc-dc converters each having first and second outputs connected in parallel to the first and second output terminals; the plurality of bi-directional dc-dc converters each having a transformer having first and second windings, the first winding being connected at a first end to the first input/output and the second winding being connected at a first end to the first output/input; the plurality of bi-directional dc-dc converters each having first and second switches, the first switch being connected between the first winding and the second input/output, and the second switch being connected between the second winding and the second output/input; a first phase-shift pulse width modulation control unit connected to each of the first switches and a second phase-shift pulse width modulation control unit connected to each of the second switches; wherein in a first operating modality, electrical power flows from the input/output terminals to the second electric power system while the first pulse width modulation control unit switches each of the first switches in succession with a predetermined phase shift and with a predetermined duty cycle to control the voltage at the output terminals; and wherein in a second operating modality electrical power flows from the output/input terminals to the first electric power system while the second pulse width modulation control unit switches each of the second switches in succession with a predetermined phase shift and with a predetermined duty cycle to control the voltage at the output terminals.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a bi-directional dc-dc converter that may provide power conversion for two separate electrical power systems on board an aircraft. The two electrical power systems may have different functions, electrical requirements and power transfer directions. The bi-directional dc-dc converter may include back-to-back dc-dc converter circuits isolated from each other by a transformer that can operate bi-directionally. N number of such dc-dc converters may be connected in parallel to increase power capability. Phase shift pulse width modulation (PWM) may be used to switch the parallel dc-dc converters so as to decrease both voltage ripple and current ripple. The number of dc-dc converters may be modified to meet the different needs of various electric power systems. As a result, a single bi-directional dc-dc converter of the invention may be employed to provide electric power conversion to multiple electric power systems, even where those systems have different power requirements and different power transfer directions.

The dc-dc converter of the present invention is unlike prior art electric power conversion systems where a single unit was not capable of handling a variety of power requirements and different power transfer directions. In such systems, multiple dc-dc converters may have been needed to meet the requirements of the different electric power systems because they did not have multiple dc-dc converters in parallel that would scale up to meet a variety of power requirements. Also, prior systems may not have reduced voltage ripple and current ripple with the use of phase-shift PWM circuits to control the power converter switching elements.

Figure 1:
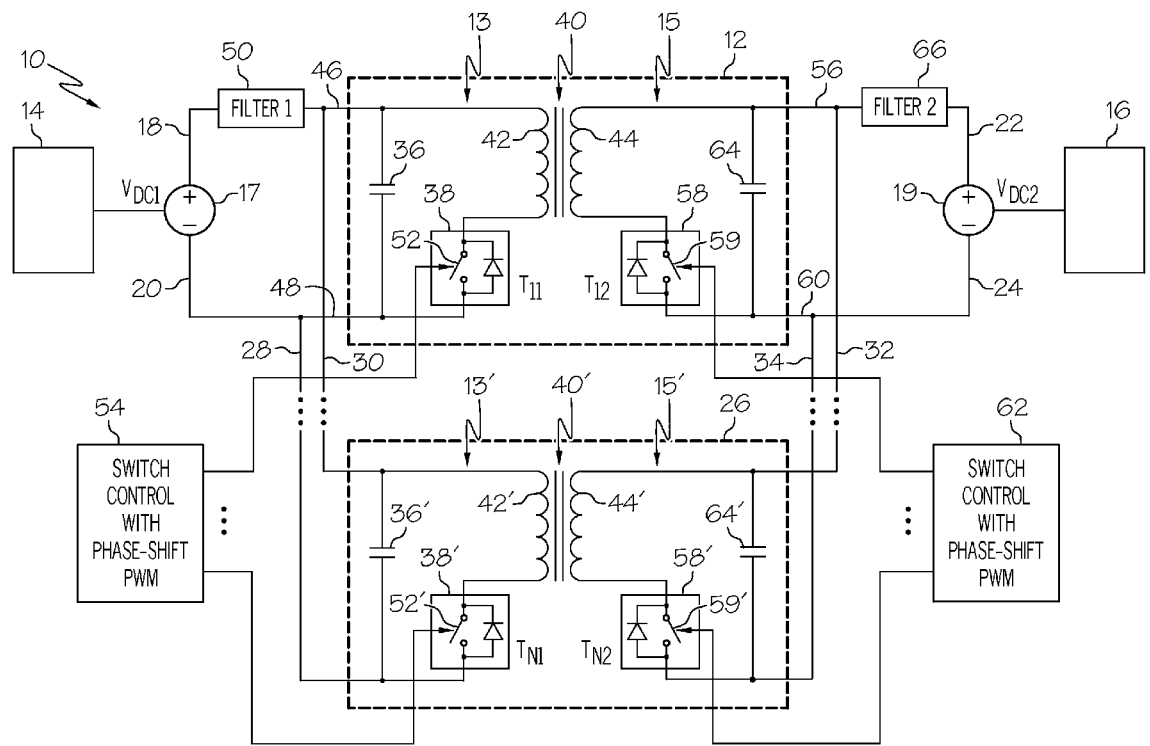
FIG. 1 is a block diagram of an isolated high power bi-directional dc-dc converter in accordance with one embodiment of the invention.

Referring now to FIG. 1, a block diagram of an insulated high power bi-directional dc-dc converter in accordance with one embodiment of the invention is shown. A converter system 10 may include a first converter 12 that may be connected between first and second electrical power systems 14, 16, through a first pair of terminals 18, 20 and a second pair of terminals 22, 24, respectively. Converter 12 in this embodiment may be in the topology of a pair of fly-back dc-dc converters in a back-to-back configuration. Other topologies may be employed, for example, back-to-back full bridge circuits or back-to-back half bridge converters may be used instead.

Electrical power systems 14, 16 may comprise, for example, separate electrical power systems on an aircraft and may include voltage sources 17, 19 respectively and one or more electrical loads. Depending on the requirements of each of the electrical power systems 14, 16, electrical power may flow from electrical power system 14 through the converter 10 to the electrical power system 16, or in the reverse direction. The direction of the flow of electrical power may change depending on the immediate needs of the electrical power systems 14, 16 at any particular time.

One or more supplemental converters 26 may be connected in parallel to each other and to the converter 12. In particular, supplemental converter 26 may be connected to the first pair of terminals 18, 20 and the second pair of terminals 22, 24 through a third pair of terminals, 28, 30 and a fourth pair of terminals 32, 34 respectively. It will be appreciated that a total number of N additional supplemental converters (not shown) may also be connected in parallel to the converters 10, 26. In one embodiment of the invention, the additional converters may be substantially identical to the converters 12 and 26. The additional converters may serve to increase the power handling capability of the converter system 10. Also, additional converters may reduce both voltage ripple and current ripple, as described in more detail below.

Converter 12 in one embodiment of the invention may comprise two bi-directional fly-back dc-dc converters integrated in back-to-back fashion and sharing the same transformer for isolation and voltage regulation. The converter 12 may have primary terminals 46, 48 connected to the first pair of terminals 18 and 20 of the first electrical power system 14. A filter 50 may be connected between terminals 18 and 46 for reducing current ripple as requested from power source/load. Converter 12 may include a primary side 13 and a secondary side 15. Primary side 15 may include a first capacitor 36, a first switch 38 and a transformer 40. Switch 38 may comprise, for example, a MOSFET transistor or an IGBT. Transformer 40 may include primary and secondary windings 42, 44. One end of the primary winding 42 may be connected to primary terminal 46 and the other end may be connected to a first side of switch 38. A second side of first switch 38 may be connected to primary terminal 48. A gate 52 of switch 38 may be connected to a first switch control unit 54.

The secondary side 15 of converter 12 may include substantially the same components as the primary side 13 in a mirror configuration. In particular, secondary winding 44 may be connected on one end to a secondary terminal 56 and at the other end to one side of a second switch 58. The other side of second switch 58 may be connected to secondary terminal 60. The gate 59 of second switch 58 may be connected to a second switch control unit 62. A capacitor 64 may be connected across secondary terminals 56 and 60. A filter 66 is connected between terminals 56 and 22 for reducing current ripple as requested from power source/load. Secondary terminal 60 may be connected to second terminal 24.

Converter 12 may operate in two modes and in two directions. When the converter is operating in a first direction, electrical power may be supplied from the power source 17 to the electrical power system 16. While the converter 12 is operating in the first direction, switch 58 may remain off continuously under control of the switch control unit 62, and switch 38 may be switched on and off during accumulation and restitution modes. Hence, when converter 12 is operating in the first direction and in an accumulation mode, switch 38 may be turned on. This may be accomplished by the switch control unit 54 sending a signal to gate 52 causing switch 38 to close. With switch 38 on, the primary winding 42 of the transformer 40 may be directly connected to the input voltage from the power source 17. This may result in an increase of magnetic flux in the transformer 40. During this time, capacitor 64 may supply previously stored electrical energy to a load in the second electrical power system 16.

In a restitution mode, switch 38 may be off, and energy stored in the transformer 40 during the accumulation mode may then be transferred both to the load in the second electrical power system 16 and to the capacitor 64. The accumulation and restitution modes may repeat at a frequency and duty cycle determined by the switch control unit 54. In particular, the duty cycle may be determined and modified using well-known pulse width modulation (PWM) techniques to achieve the conversion of the input voltage provided by the power source 17 into a desired output voltage across second terminals 22 and 24. The particular output voltage may be determined by the needs of the electrical power system 16.

If the needs of the electrical power systems 14 and 16 are such that electrical power is desired to be supplied in a second direction, that is, from the power source 19 to the electrical power system 14, the converter 12 may operate as discussed above, but in reverse. That is, switch 38 may remain off continuously and switch 58 may be switched on and off under the control of the switch control unit 62 to produce the accumulation and restitution modes at a particular PWM duty cycle to provide the desired voltage needed by the electrical power system 14.

It will be appreciated that the operation of the converter 12 as described above, by itself, may have two drawbacks: it may produce an undesirable ripple in the output voltage, and it may not be able to generate sufficient electrical power to meet the needs of the electrical power systems 14 or 16. In accordance with the invention, these limitations may be addressed by providing an N number of supplemental converters 26 connected in parallel with converter 12, as shown in FIG. 1.

Supplemental converters 26 may comprise N number of identical converters 12 and may operate in the same manner as converter 12, as discussed above. Hence, supplemental converters 26 may include: transformer 40'; primary and secondary sides 13', 15'; primary and secondary windings 42', 44'; switches 38', 58'; gates 52', 59'; and capacitors 36', 64'. However, the same switch control units 54 and 62 may be connected to all of the switches 38, 38' and 58, 58' in the converter 12 and in all of the N number of supplemental converters 26, to control the operation of the converters as described in more detail below.

In one embodiment of the invention, switch control units 54 and 62 may operate in a phase-shift PWM mode to reduce the occurrence of both output voltage ripple and input current ripple. That is, for example, when operating in the first direction, switch control unit 54 may control the timing of the sequence of the switching of the switch 38, and N number of switches 38', such that there may be a controlled phase shift between the duty cycles of successive switches 38, 38'. Both output voltage ripple and input current ripple can be significantly reduced in this manner because the switches 38 and 38' will not be in a conductive state at the same time intervals.

Figure 2A:
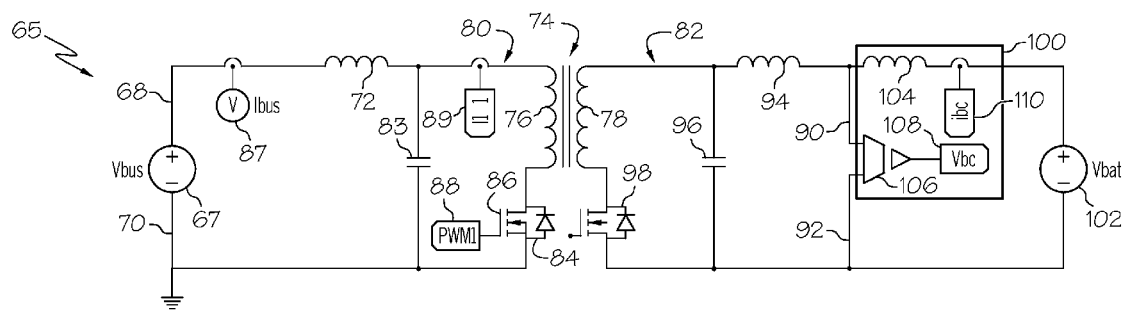
FIG. 2A is a block diagram of a single-stage pulse width modulated circuit employed with the isolated high power bi-directional dc-dc converter shown in FIG. 1.

Referring now to FIG. 2A, a converter 65 in accordance with one embodiment of the invention is shown. Converter 65 is similar to the converter 12, except that in this embodiment it may be configured to operate, in one direction, as a battery charger. Converter 65 may include a voltage supply 67 connected to input terminals 68 and 70. A filter 72 comprising an inductor may be connected in series with the input terminal 68. A transformer 74 may include primary windings 76 and secondary windings 78 connected to a primary side 80 and a secondary side 82 respectively of the converter 65. A capacitor 83 may be connected to the filter 72 and to the input terminal 70. Capacitor 83 may also be connected to one end of the primary winding 76 and a switch 84 may be connected to the other end of the primary winding 76. The other end of the switch may be connected to the input terminal 70. A switch control unit 88 may be connected to a gate 86 of the switch 84. A current sensor 87 and a current sensor 89 may perform the functions of current feedback for control and protection.

On the secondary side 82 of the converter 65 similar components may be used as in the primary side 80, but in a mirror configuration. Thus, a first output terminal 90 may be connected to a filter 94 and also to a power source 91. A second output terminal 92 may be connected to a second end of the secondary winding 78. The other end of the filter 94 may be connected to a capacitor 96, and also to a first end of the secondary winding 78. A second switch 98 may be connected between the second output terminal 92 and the secondary winding 78, but is continuously turned off by its switch control unit which is not shown in FIG. 2A, and only its parallel diode is functioning in the mode shown in FIG. 2A, where the converter 65 is operating in one direction only, as a battery charger.

A battery charger circuit 100 may be connected to the output terminals 90, 92 to generate the desired current from the converter 65 output so as to charge battery 102. Battery charger circuit 100 may include inductor 104, voltage sensor 106, and current sensor 110. A inductor 104 may perform the function of reducing the current ripple requested by battery 102. A voltage sensor 106 and a current sensor 110 may perform the functions of voltage and current feedback for control and protection, respectively.

Figure 3A:
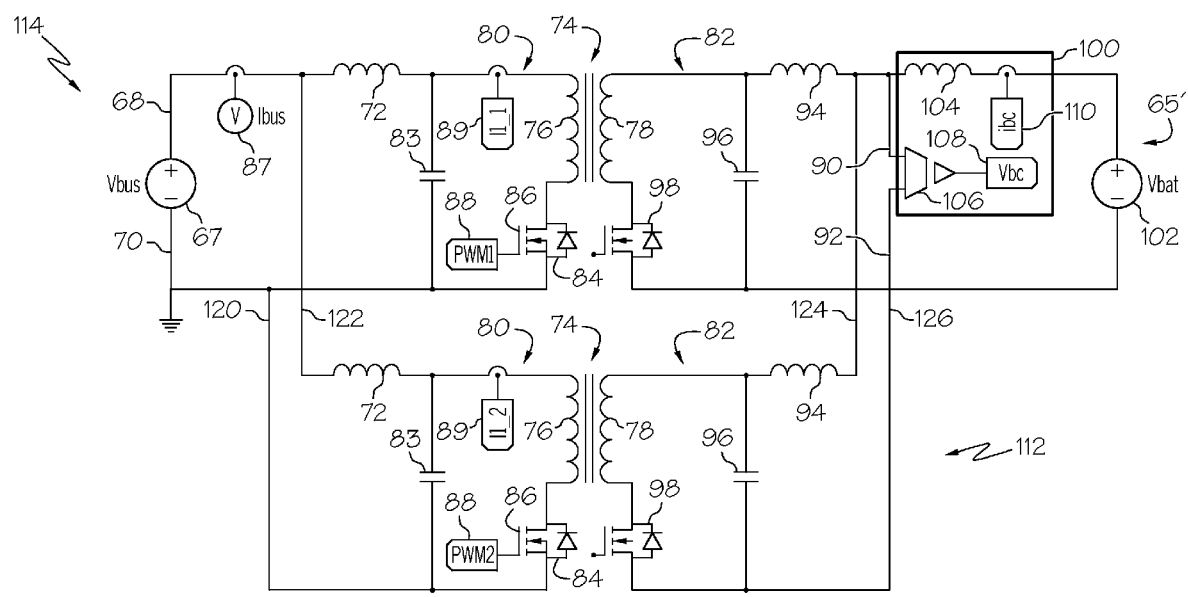
FIG. 3A is a block diagram of a two-stage phase-shifted pulse width modulated circuit employed with the isolated high power bi-directional dc-dc converter shown in FIG. 1.

FIG. 3A shows another embodiment of the invention which may be the same as the embodiment in FIG. 2A except for the addition of one supplemental converter 112. In particular, converter 114 may include a converter 65' with the same components as converter 65, and a supplemental converter 112 connected in parallel. Supplemental converter 112 also may have the same components as converter 65 without the battery charger circuit 100 and may be connected to converter 65' through terminals 120, 122, 124 and 126.

Figure 4A:
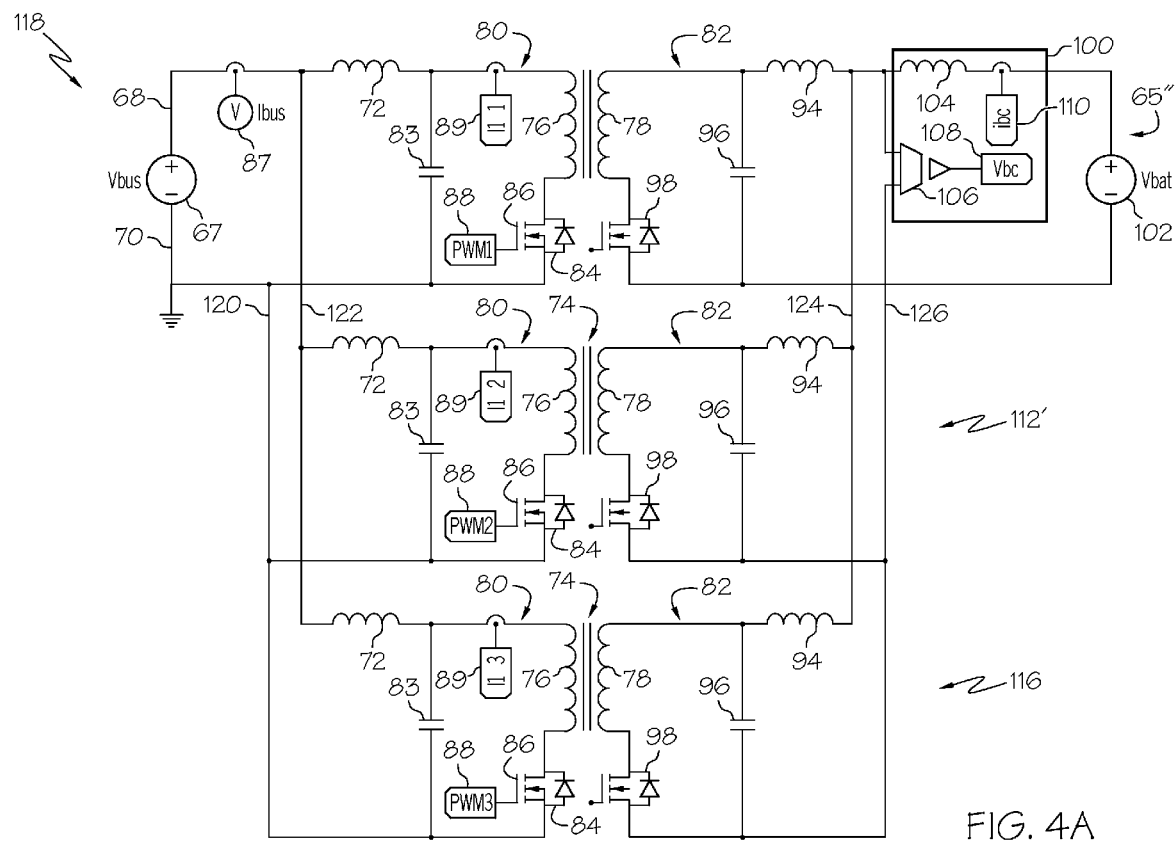
FIG. 4A is a block diagram of a three-stage phase-shifted pulse width modulated circuit employed with the isolated high power bi-directional dc-dc converter shown in FIG. 1.

Similarly, FIG. 4A shows another embodiment of the invention, which may be the same as the embodiment in FIG. 3A with the addition of a second supplemental converter 116. In particular, converter 118 may include converter 65", supplemental converter 112' and supplemental converter 116 connected in parallel. Converter 65" may have the same components as converter 65'. Supplemental converter 112' and supplemental converter 116 may all have the same components as converter 112 and may be connected to converter 65" through terminals 120, 122, 124 and 126.

Although multiple switch control units 88 are shown in FIGS. 3A and 4A, for ease of illustration, they actually may be representations of the same component. The operation of the switch control units 88 to achieve phase-shift PWM is as follows. Phase-shift PWM is used with the present invention to provide a certain phase shift to the synchronized PWM drive signals sent to each of the individual converters in parallel operation. The phase-shift time may be described by equation (1), where N is the number of converters in parallel and $f_S$ is the switching frequency.

$$T_{ph}=1/N \cdot 1/f_S \qquad (1)$$

With the use of phase-shifted PWM, the energy flowing from the input to output can be more continuous since the power switches of the converters are not in a conduction state at the same time intervals. As a result, the input current harmonics can be much reduced and input filters can be designed smaller. Furthermore, the superimposition of the phase-shifted, triangle inductor current waveforms may lead to reduced output current ripple, and thus a suppression of output voltage ripple.

Figure 2B:
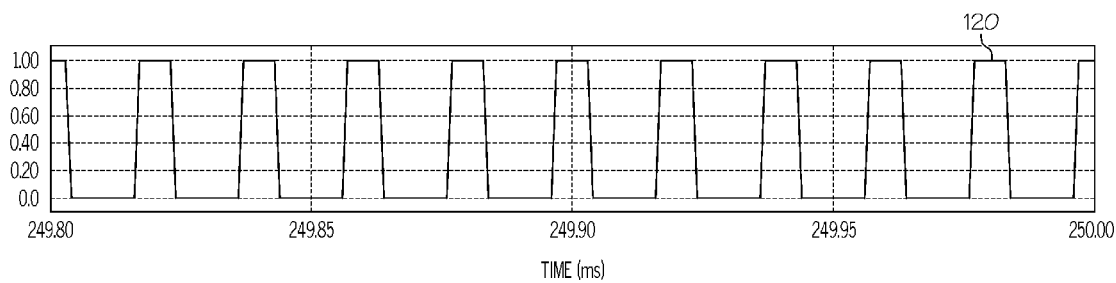
FIG. 2B is a timing diagram illustrating the operation of the single stage pulse width modulated circuit shown in FIG. 2A.
Figure 2C:
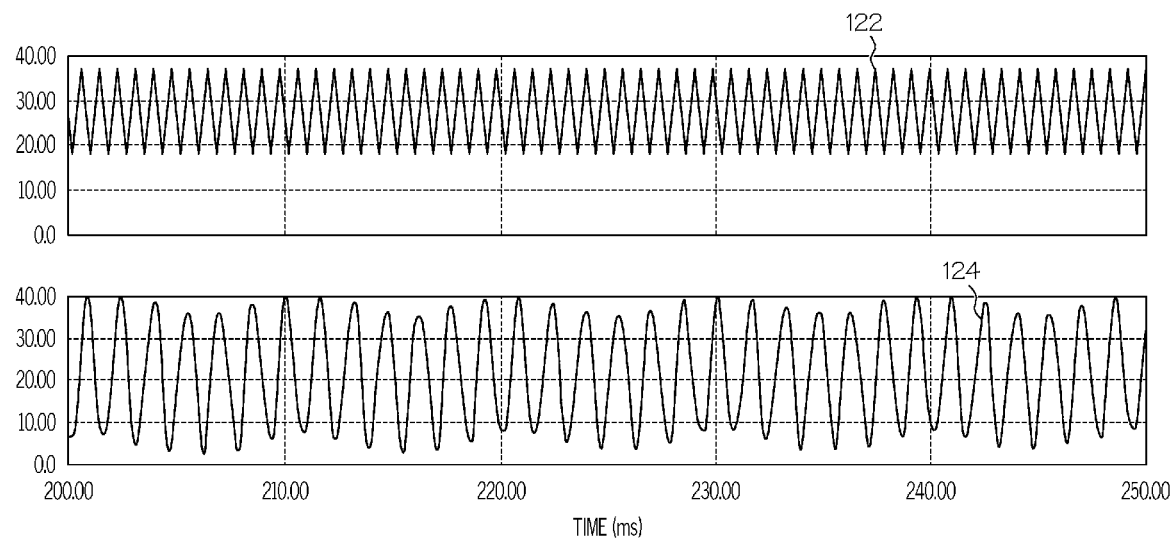
FIG. 2C is a simulation result showing waveforms of output voltage and input current of the converter shown in FIG. 2A with the use of single-stage PWM shown in FIG. 2B.
Figure 3B:
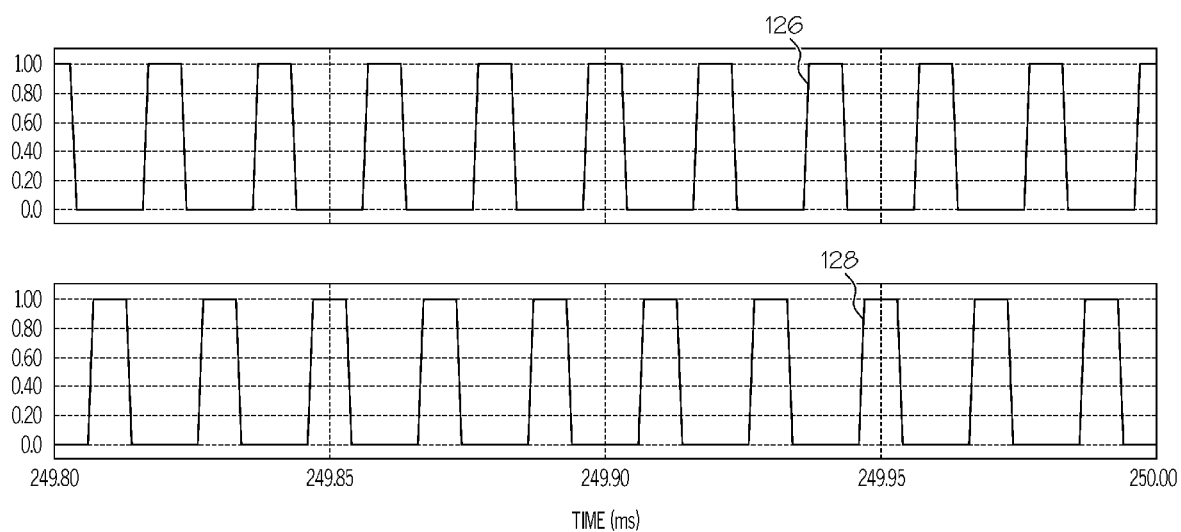
FIG. 3B is a timing diagram illustrating the operation of the two-stage phase-shifted pulse width modulated circuit shown in FIG. 3A.
Figure 3C:
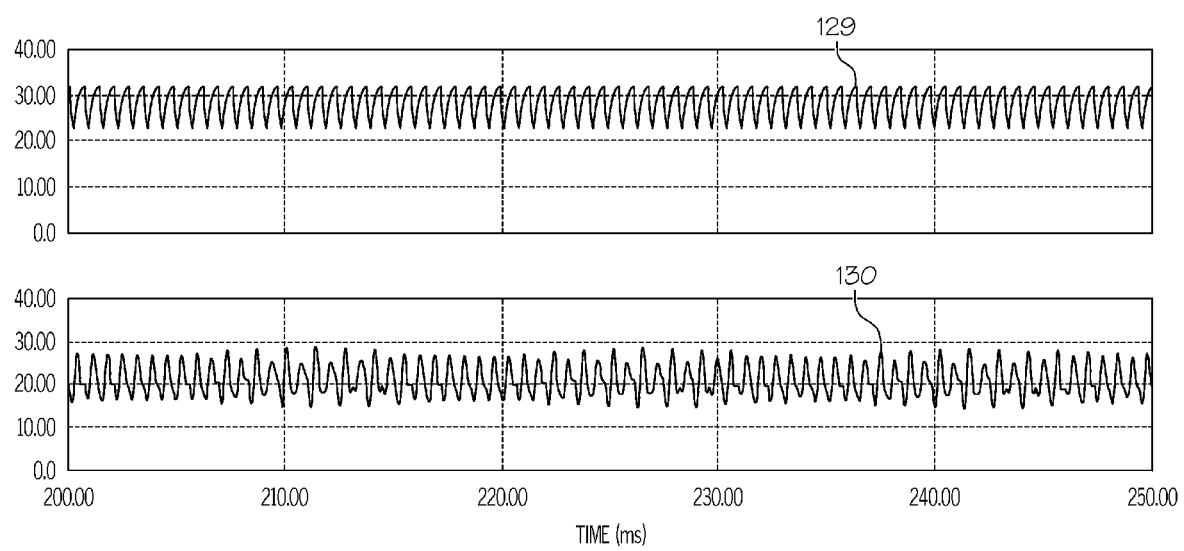
FIG. 3C is a simulation result showing waveforms of output voltage and input current of the converter shown in FIG. 3A with the use of two-stage phase-shifted PWM shown in FIG. 3B.
Figure 4B:
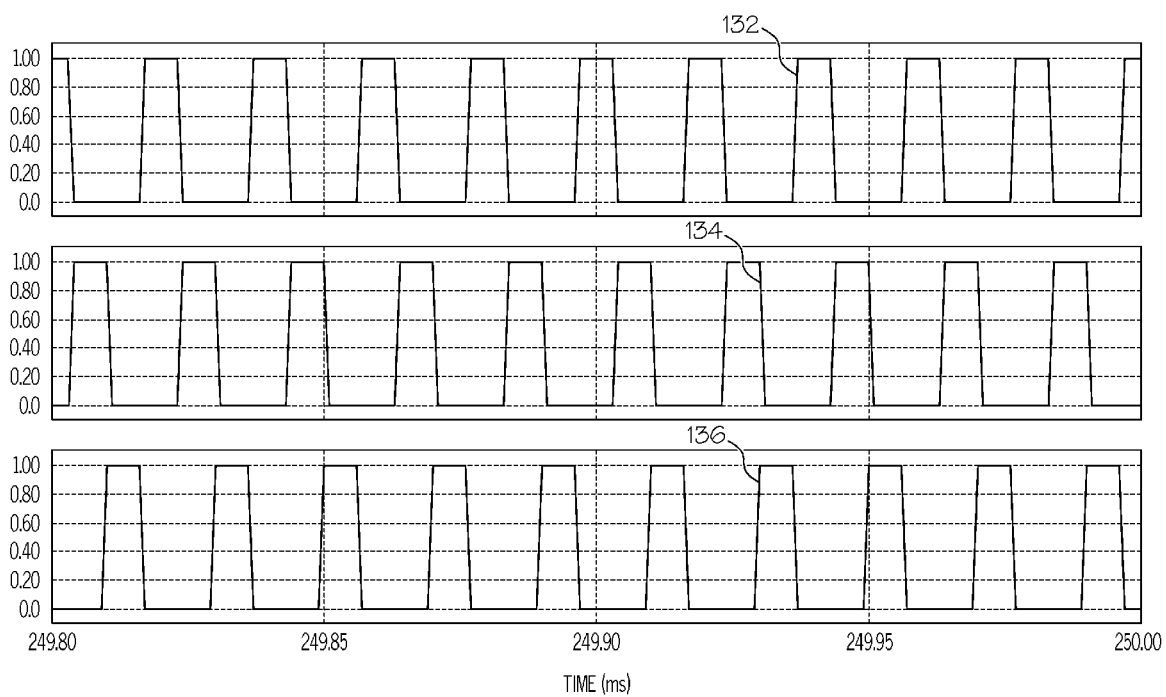
FIG. 4B is a timing diagram illustrating the operation of the three-stage phase-shifted pulse width modulated circuit shown in FIG. 4A.
Figure 4C:
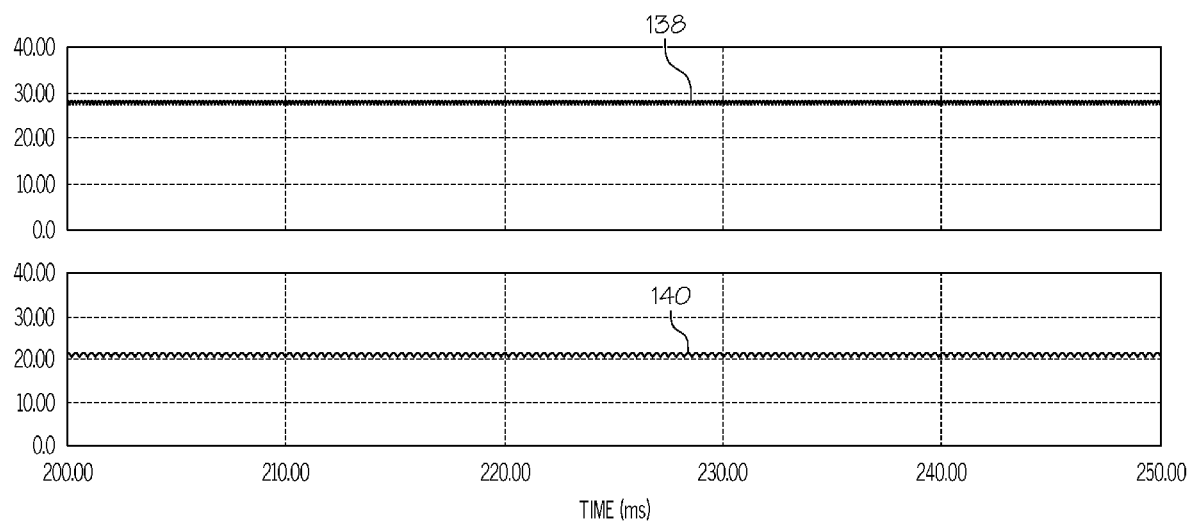
FIG. 4C is a simulation result showing waveforms of output voltage and input current of the converter shown in FIG. 4A with the use of three-stage phase-shifted PWM shown in FIG. 4B.

FIGS. 2B, 3B and 4B show PWM timing diagrams for converters 65, 114, and 118 respectively. FIGS. 2C, 3C and 4C show the simulated waveforms of input current and output voltage for converter 65, 114, and 118, respectively, at the same power rate.

FIG. 2B shows the PWM signal coming from switch control unit 88 in FIG. 2A during a period of time of about 0.2 milliseconds. This signal shown in curve 120 is labeled PWM1. When the PWM signal is at the 1.0 Volt level, the converter 82 may be in the above-discussed accumulation mode, where switch 84 is on and magnetic energy is accumulating in the transformer 74. When the PWM signal is at the 0.0 Volt level, switch 84 may be off and the converter 82 may be in the above-discussed restitution mode, where the energy in the transformer may be transferred to the secondary side 82 of the converter 65. This may have the effect of charging up capacitor 96 and may also increase the voltage across terminals 90 and 92. FIG. 2C shows the simulated waveforms of input current and output voltage for converter 65 controlled by the PWM signal shown in FIG. 2B. In FIG. 2C, the top chart 122 shows the output voltage across terminals 90 and 92 of the converter 65. The bottom chart 124 of FIG. 2C shows the current flowing out of the power source 67 of the converter 65. Both waveforms may indicate that, even with filters, there may be significant ripple in the input current flowing out of the power source 67 and output voltage across terminals 90 and 92.

In FIG. 3B, the curve labeled PWM1 in the top chart 126 may be the same as the curve labeled PWM1 in chart 120 in FIG. 2B. The curve labeled PWM2 in the chart 128 FIG. 3B may be the same as PWM1 except that is phase-shifted from PWM1 by 180 degrees. FIG. 3C shows the simulated waveforms of input current and output voltage for converter 114 controlled by the PWM signals shown in FIG. 3B. In FIG. 3C, the top chart 129 shows the output voltage across terminals 90 and 92 of the converter 114. The bottom chart 130 of FIG. 3C the current flowing out of the power source 67 of the converter 114. FIG. 3C indicates that there may still be some input current ripple and output voltage ripple, they may be much less than in the converter 65 which does not have supplemental converter 112.

In FIG. 4B, the three charts 132, 134 and 136 show the three phase-shifted PWM signals, PWM1, PWM2 and PWM3, respectively. These three PWM signals may be phase-shifted from the preceding PWM signal by 120 degrees. FIG. 4C shows the simulated waveforms of input current and output voltage for converter 118 controlled by the PWM signals shown in FIG. 4B. In FIG. 4C, the top chart 138 shows the output voltage across terminals 90 and 92 of the converter 114. The bottom chart 140 of FIG. 4C the current flowing out of the power source 67 of the converter 118. FIG. 4C indicates that the converter 118 may have even much less input current ripple and output voltage ripple than the converters 65 and 112 because of one more supplemental converter 116 with the use of phase-shift PWM.

It will be appreciated that the addition of supplemental converters 112 and 116 may not only reduce voltage ripple and current ripple, but may also increase maximum total electrical power output of converters 114 and 118. In the application shown in FIGS. 2A, 3A and 3B, the output may be used to charge a battery 102. In other applications this increased output power may be used to supply power to a variety of different kinds of electrical loads.

Referring again to FIG. 1 in one embodiment of the invention, the phase-shifting PWM techniques shown in FIGS. 3A,B, and 4A,B may be employed in the converter 10. Where there are N number of additional supplemental converters 26, the switch control unit 54 may generate PWM signals that are out of phase from the preceding supplemental converter by and amount calculated according to 360/N degrees.\

It should be understood, of course, that the foregoing relates to exemplary embodiments of the invention and that modifications may be made without departing from the spirit and scope of the invention as set forth in the following claims.

We claim:

1. A system for providing electrical power comprising:
at least a first and a second converter, each having a switch, a first pair of terminals, and a second pair of terminals, wherein:
    a first terminal of said first pair of terminals of each of said at least a first and a second converter being connected to each other in parallel,
    a second terminal of said first pair of terminals of each of said at least a first and a second converter being connected to each other in parallel,
    a first terminal of said second pair of terminals of each of said at least a first and a second converter being connected to each other in parallel, and
    a second terminal of said second pair of terminals of each of said at least a first and a second converter being connected to each other in parallel;
a phase-shift pulse width modulation controller connected to each of said switches, said phase-shift pulse width modulation controller generating a control signal including a series of pulses that cause said switches to turn on and off; and
said series of pulses being timed such that said pulses controlling switches in different ones of said at least a first and a second converters are out of phase with each other, wherein each switch of the converters is not in a conduction state at the same time, and wherein the pulse width modulation signals are phase-shift pulse width modulation signals having a phase-shift time described by the equation $$T_{ph}=1/N1/f_s,$$

wherein N is the number of converters in parallel and $f_s$ is the switching frequency.

2. The system of claim 1 wherein said pulses controlling successive ones of said at least a first and a second converter are out of phase by a fixed amount.

3. The system of claim 2 wherein said at least a first and a second converter include two converters.

4. The system of claim 3 wherein said pulses controlling successive ones of said at least a first and a second converter are out of phase by 180 degrees.

5. The system of claim 2 wherein said at least a first and a second converter include three converters.

6. The system of claim 5 wherein said pulses controlling successive ones of said at least a first and a second converter are out of phase by 120 degrees.

7. The system of claim 1 wherein said at least a first and a second converter include dc-dc converters.

8. The system of claim 1 wherein said at least a first and a second converter include bi-directional converters.

9. A converter system comprising:
a first converter circuit having input and output terminals, said first converter also having a first transformer having first and second windings;
said first converter circuit having a first switch coupled to said input/output terminals and to said first winding;
said first converter circuit having a capacitor coupled to said second winding and to said output/input terminals;
a second converter circuit having input and output terminals, said second converter circuit also having a second transformer having first and second windings;
said second converter circuit having a second switch coupled to said input/output terminals and to said first winding, wherein said second converter circuit input/output terminals are connected to said first converter circuit input/output terminals in a parallel configuration;
a pulse width modulation controller connected to said first and second switches, said pulse width modulation controller generating pulse width modulation signals that switch said first and second switches, wherein said pulse width modulation signals have a duty cycle that modifies the voltage of said output voltage;

wherein said pulse width modulation signals connected to said first and second switches are 180 degrees out of phase;

wherein said first and second switches are switched on and off at different times;

wherein an output voltage generated by said system is a combination of voltages generated by said first and second converter circuits;

wherein the first and second switches are not in a conduction state at the same time;

wherein the pulse width modulation signals are phase-shift pulse width modulation signals having a phase-shift time described by the equation $$T_{ph}=1/N1/f_s,$$

wherein N is the number of converters in parallel and $f_s$ is the switching frequency.

10. The converter of claim 9, further comprising N additional converter circuits, each having primary switches connected to said pulse width modulation controller and wherein said pulse width modulation signals for each switch are out of phase with the pulse width modulation signals to a switch in a succeeding converter by an amount equal to 360/N degrees.

11. The converter of claim 9, wherein said first converter comprises:
a third switch coupled to said output/input terminals and to said second winding;
a capacitor coupled to said first winding and to said input/output terminals; and
a pulse width modulation controller connected to said third switch, wherein in a reverse direction, said converter generates an output voltage at said input/output terminals.

12. The converter of claim 9 wherein said first converter circuit includes one of the following circuit topologies in a back-to-back configuration: fly-back, full bridge (H-bridge) and half bridge.

13. The converter of claim 9 wherein said input and output terminals are electrically isolated from each other by said first and second transformers.

* * * * *